Sept. 29, 1931. T. H. CAROW 1,825,503
EYEGLASS FRAME
Filed May 17, 1929
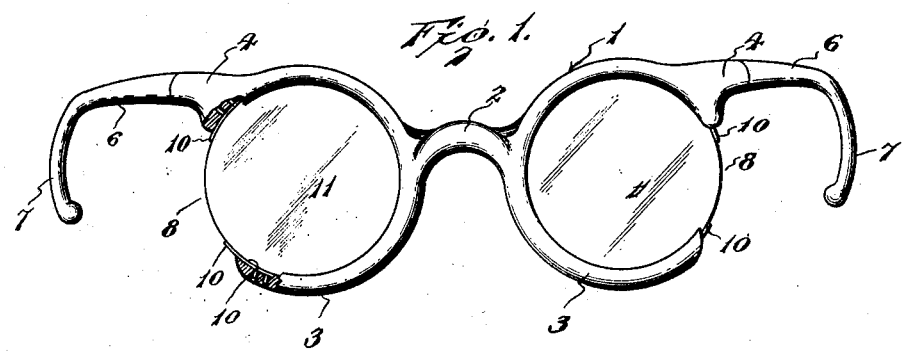
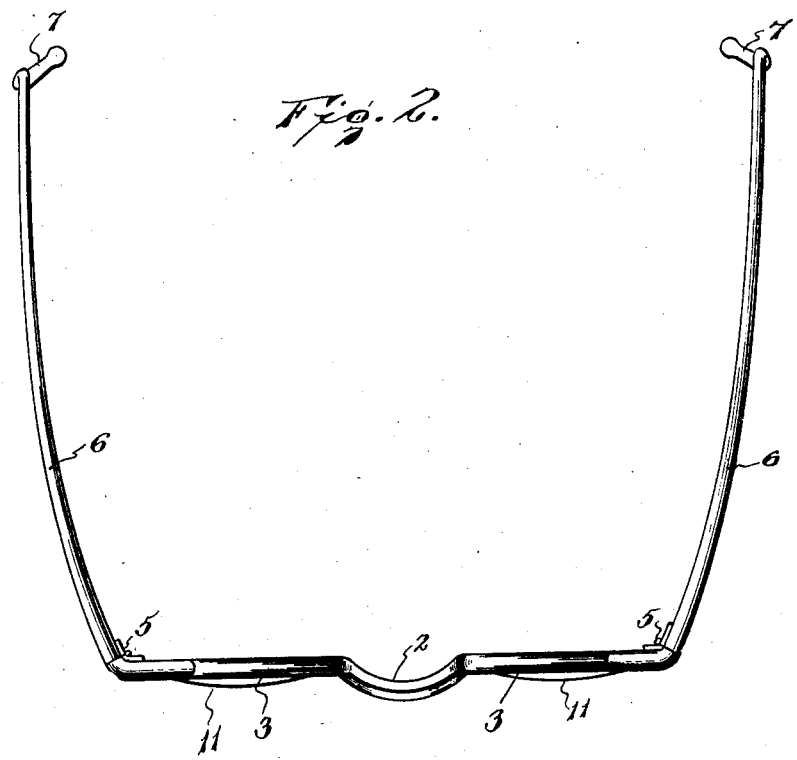
Inventor
T. H. Carow
By
Lacey & Lacey, Attorneys Patented Sept. 29, 1931

1,825,503

UNITED STATES PATENT OFFICE

THOMAS H. CAROW, OF SAN ANTONIO, TEXAS, ASSIGNOR OF ONE-HALF TO RUSSELL J. KIEFFER, OF SAN ANTONIO, TEXAS

EYEGLASS FRAME

Application filed May 17, 1929. Serial No. 363,864.

The present invention is directed to improvements in eye glass frames.

The primary object of the invention is to provide a device of this character so constructed that the lens rims will in no way interfere with the vision at the outer sides of the rims.

Another object of the invention is to provide a device of this character wherein the lens rims are cut away to provide unobstructed gaps in their outer sides to permit clear vision from either side and, further, to provide springs which extend into the gaps for engagement with the lens to positively maintain the same tightly retained within the rims.

With these and other objects in view, this invention resides in the novel features of construction, formation, combination and arrangement of parts to be hereinafter more fully described, claimed and illustrated in the accompanying drawings, in which:

Figure 1 is a front view of the device.

Figure 2 is a top plan view.

Referring to the drawings, 1 designates the frame, formed from any suitable material, said frame comprising the usual nose bridge bar 2, which is connected at its ends to the lens rims 3.

The rims 3 have formed upon their upper portions extensions 4 to which are connected by hinges 5, the temples 6 having the ear engaging hooks 7, as is customary. These rims are cut to provide open gaps 8 at their outer sides, the terminals 9 of the rims defining the gaps having spring fingers 10 suitably fixed therein and which extend for a short distance into the gaps for engaging the peripheries of the lens 11, as clearly shown in Figure 1 of the drawings. By providing the gaps the peripheries of the lens 11 for a short distance will be uncovered and, consequently, unobstructed. Since the lens are left exposed in this manner, clear vision from either side can be had. As is well known, the entire peripheries of the lens are covered by the rims when used in connection with the conventional form of frame, which construction interferes with the vision at both sides, whereas the present construction is such that a clear and unobstructed vision is had. This is extremely desirable when a person glances sidewise without turning the head.

It is a well known fact to persons who are compelled to wear eye glasses wherein continuous rims are employed that portions of the rims obstruct the vision when glancing sidewise, and it is to overcome this defect that the present invention has been perfected.

From the foregoing, it is thought that the operation and many advantages of the herein described invention will be apparent to those skilled in the art without further description and it will be understood that various changes in the size, shape, proportion, materials, and minor details of construction may be resorted to without departing from the spirit or sacrificing any of the advantages of the invention.

What is claimed is:

In a pair of spectacles, a nose bridge bar, frames for the lenses having the outer end portions cut away remote from the bridge bar to provide gaps which permit unobstructed lateral vision, lenses in said frames, extensions projecting from the frames near the upper ends of the gaps, temples hinged to the extensions, and curved leaf springs for retaining the lenses, said springs being secured to the inner edges of the ends of the frame above and below the gaps and engaging the edges of the lenses.

In testimony whereof I affix my signature.

THOMAS H. CAROW. [L. S.]